United States Patent
Choi et al.

(10) Patent No.: US 9,317,067 B2
(45) Date of Patent: Apr. 19, 2016

(54) FOLDABLE DISPLAY DEVICE, RELATED ELECTRONIC DEVICE, AND RELATED METHOD

(71) Applicant: Samsung Display Co., LTD., Yongin, Gyeonggi-Do (KR)

(72) Inventors: Dong-Wook Choi, Hwaseong-si (KR); Jeong-Eun Seo, Seongnam-si (KR); Hyun-Ah Suh, Seoul (KR); Young-Jin Lee, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 210 days.

(21) Appl. No.: 14/219,630

(22) Filed: Mar. 19, 2014

(65) Prior Publication Data

US 2015/0146349 A1 May 28, 2015

(30) Foreign Application Priority Data

Nov. 26, 2013 (KR) .......................... 10-2013-0144271

(51) Int. Cl.
  *G06F 1/16* (2006.01)
(52) U.S. Cl.
  CPC ............ *G06F 1/1641* (2013.01); *G06F 1/1677* (2013.01)
(58) Field of Classification Search
  CPC combination set(s) only.
  See application file for complete search history.

(56) References Cited

U.S. PATENT DOCUMENTS

| | | | | |
|---|---|---|---|---|
| 6,765,550 B2 * | 7/2004 | Janick | ...................... | G02B 5/00 345/87 |
| 6,771,232 B2 * | 8/2004 | Fujieda | ................. | G06F 1/1615 345/30 |
| 7,667,962 B2 * | 2/2010 | Mullen | ................. | G06F 1/1624 359/461 |
| 8,380,327 B2 * | 2/2013 | Park | ....................... | G05B 11/01 29/592.1 |
| 8,502,788 B2 * | 8/2013 | Cho | ....................... | G06F 1/1626 345/173 |
| 8,711,566 B2 * | 4/2014 | O'Brien | ................. | G06F 1/1624 361/724 |
| 8,787,016 B2 * | 7/2014 | Rothkopf | ............ | H04M 1/0216 361/679.02 |
| 8,971,032 B2 * | 3/2015 | Griffin | ................... | G06F 1/1616 345/156 |
| 9,013,864 B2 * | 4/2015 | Griffin | ................. | H04M 1/0216 16/382 |
| 2010/0188422 A1 | 7/2010 | Shingai et al. | | |
| 2011/0188189 A1 * | 8/2011 | Park | ....................... | G05B 11/01 361/679.05 |
| 2014/0029190 A1 * | 1/2014 | Sato | ...................... | G06F 1/1641 361/679.27 |
| 2015/0023030 A1 * | 1/2015 | Tsukamoto | ........... | G06F 1/1652 362/419 |
| 2015/0049428 A1 * | 2/2015 | Lee | ....................... | G06F 1/1641 361/679.27 |

FOREIGN PATENT DOCUMENTS

| | | |
|---|---|---|
| JP | 2003-0280546 | 10/2003 |
| JP | 3728938 | 12/2005 |
| JP | 2007-214908 | 8/2007 |
| JP | 2011-085934 | 4/2011 |
| KR | 10-1037794 | 5/2011 |
| KR | 10-1067587 | 9/2011 |

* cited by examiner

*Primary Examiner* — Lisa Lea Edmonds
(74) *Attorney, Agent, or Firm* — Innovation Counsel LLP

(57) ABSTRACT

A display device may include a foldable display member. The foldable display member may include a first portion, a second portion, and a bendable portion. The first portion may be connected through the bendable portion to the second portion. The display device may further include a first controllable member that may overlap the bendable portion. The display device may further include a control unit connected to the first controllable member and configured to provide a first signal to control a size of the first controllable member according to a magnitude of an angle between the first portion and the second portion.

20 Claims, 8 Drawing Sheets

ANGLE : 0°
VOLTAGE : V1

FOLDABLE DISPLAY DEVICE, RELATED ELECTRONIC DEVICE, AND RELATED METHOD

CROSS-REFERENCE TO RELATED APPLICATION(S)

This application claims priority under 35 USC §119 to Korean Patent Application No. 10-2013-0144271, filed on Nov. 26, 2013 in the Korean Intellectual Property Office (KIPO), the contents of the Korean Patent Application being incorporated herein by reference.

BACKGROUND

1. Technical Field

The present invention is related to a foldable display device, an electronic device that includes the foldable display device, and a method related to the foldable display device.

2. Description of the Related Art

An electronic device (e.g., one of a cellular phone, a smart phone, a smart pad, a computer, a laptop, a television, etc.) that includes a foldable display device may provide better portability than a similar electronic device that includes a generally non-foldable display device. Nevertheless, as folding operations and unfolding operations of the foldable display device are repetitively performed, a bent portion of the foldable display device may become undesirably (and permanently) deformed. For example, the bent portion of the foldable display device may become creased. As a result, images displayed by the foldable display device may be distorted at the bent portion of the foldable display device, such that the image display quality of the foldable display device may become undesirable.

SUMMARY

Example embodiments may be related to a foldable display device capable of substantially preventing, minimizing, and/or removing creases at a bendable portion of the foldable display device. Image distortion at the bendable portion of the foldable display device potentially caused by creases may be substantially prevented or minimized. Advantageously, the foldable display device may display images with satisfactory quality. Embodiments of the invention may be related to an electronic device that includes the foldable display device. Embodiments of the invention may be related to a method for controlling a surface structure of the foldable display such that creases may be substantially prevented, minimized, and/or removed.

Embodiments of the invention may be related to a display device that may include a foldable display member. The foldable display member may include a first portion, a second portion, and a bendable portion. The first portion may be connected through the bendable portion to the second portion. The display device may further include a first controllable member that may overlap the bendable portion. The display device may further include a control unit connected to the first controllable member and configured to provide a first signal to control a size of the first controllable member according to a magnitude of an angle between the first portion and the second portion.

In example embodiments, the first signal is configured to control the first controllable member to enlarge if the angle is reduced, and wherein the first signal is configured to control the first controllable member to contract if the angle is enlarged.

In example embodiments, the first signal may be a voltage.

In example embodiments, the control unit may be further configured to determine a value of the first signal according to a surface condition of the bendable portion.

In example embodiments, the display device may include a memory device. The memory device may store a mapping relation between values of the first signal and magnitudes of the angle. The control unit may be configured to determine a value of the first signal using the mapping relation.

In example embodiments, the memory device may be configured to update the mapping relation according to degradation of the bendable portion.

In example embodiments, the first controllable member may include a first terminal and a second terminal. The first terminal may be electrically connected to the control unit. The second terminal may be electrically connected to a ground.

In example embodiments, the first terminal may be electrically connected through a switching element to the control unit.

In example embodiments, the display device may include a second controllable member that may overlap the bendable portion. The first controllable member may overlap a first region of the bendable portion. The second controllable member may overlap a second region of the bendable portion. The control unit may be connected to the second controllable member and may be configured to control a size of the second controllable member.

In example embodiments, the display device may include a first switching element electrically connected between the control unit and the first controllable member. The display device may further include a second switching element electrically connected between the control unit and the second controllable member.

In example embodiments, the control unit may be configured to provide a second signal to control the size of the second controllable member. A value of the second signal may be unequal to a value of the first signal when the control unit provides first signal and the second signal simultaneously.

In example embodiments, the control unit may be configured to provide a second signal to control the size of the second controllable member. A value of the second signal may be determined by the control unit according to a surface condition of the second region of the bendable portion.

Example embodiments of the invention may be related to an electronic device that may include the following elements: a first body member; a foldable display member overlapping the first body member and including a first portion, a second portion, and a bendable portion, wherein the first portion is connected through the bendable portion to the second portion; a controllable member overlapping the bendable portion; and a control unit connected to the controllable member and configured to provide a signal to control a size of the controllable member according to a magnitude of an angle between the first portion and the second portion.

In example embodiments, the first body member may include a flexible portion, and the controllable member may be disposed between the bendable portion and the flexible portion.

In example embodiments, the electronic device may include a hinge and may include a second body member connected through the hinge to the first body member. The controllable member may be disposed between the bendable portion and the hinge.

Embodiments of the invention may be related to a method for controlling a surface structure of a foldable display device.

The foldable display device may include a foldable display member. The method may include the following steps: determining a magnitude of an angle between two portions of the foldable display member; and according to the magnitude of the angle, providing a first signal to a first controllable member to control a size of the first controllable member, the first controllable member overlapping a bendable portion of the foldable display member, the two portions of the foldable display member being connected to each other through the bendable portion of the foldable display member.

In example embodiments, the first signal may control the first controllable member to enlarge if the angle is reduced, and the first signal may control the first controllable member to contract if the angle is enlarged.

In example embodiments, the method may include the following steps: determining a value of the signal using a stored relation that specifies mapping between magnitudes of the angle and values of the signal; and updating the stored relation according to degradation of the bendable portion.

In example embodiments, the method may include the following steps: providing a second signal to a second controllable member to control a size of the second controllable member. The first controllable member may overlap a first region of the bendable portion of the foldable display member. The second controllable member may overlap a second region of the bendable portion of the foldable display member.

In example embodiments, the method may include the following steps: determining a value of the first signal according to a surface condition of the first region of the bendable portion of the foldable display member; and determining a value of the second signal according to a surface condition of the second region of the bendable portion of the foldable display member.

Example embodiments of the invention may be related to an electronic device that may include the following elements: a foldable display configured to display an image on a front-side of the foldable display and to perform a folding operation at a bendable portion; a body combined with the foldable display; and a shape memory member configured to minimize creases of the bendable portion based on a control voltage that is generated in response to a folding angle of the foldable display, the shape memory member being attached to a back-side of the foldable display and overlapping the bendable portion.

In example embodiments, the body may be manufactured with flexible materials to support the folding operation of the foldable display.

In example embodiments, the body may be manufactured with non-flexible materials, and may include a hinge that supports the folding operation of the foldable display.

In example embodiments, the body may include a folding control unit configured to sense the folding angle of the foldable display, to determine the control voltage responding to the folding angle of the foldable display, and to apply the control voltage to the shape memory member.

In example embodiments, the shape memory member may be transformed to have a curvature corresponding to the folding angle of the foldable display based on the control voltage.

In example embodiments, the folding control unit may determine the control voltage corresponding to the folding angle of the foldable display based on a mapping table that stores mapping information between the control voltage and the folding angle of the foldable display.

In example embodiments, the control voltage may increase as the folding angle of the foldable display increases. In addition, the shape memory member may be a member that contracts as the control voltage increases.

In example embodiments, the control voltage may decrease as the folding angle of the foldable display increases. In addition, the shape memory member may be a member that expands as the control voltage increases.

In example embodiments, the mapping table may be updated according to degradation of the bendable portion.

Example embodiments of the invention may be related to an electronic device that may include the following elements: a foldable display configured to display an image on a front-side of the foldable display and to perform a folding operation at a bendable portion; a body combined with the foldable display; and a plurality of shape memory members configured to separately minimize creases of the bendable portion based on at least a control voltage that is generated in response to a folding angle of the foldable display, the shape memory members being attached to different regions of a back-side of the foldable display and overlapping different regions of the bendable portion.

In example embodiments, the body may be manufactured with flexible materials to support the folding operation of the foldable display.

In example embodiments, the body may be manufactured with non-flexible materials, and may include a hinge that supports the folding operation of the foldable display.

In example embodiments, the body may include a folding control unit configured to sense the folding angle of the foldable display, to determine the control voltage responding to the folding angle of the foldable display, and to apply the control voltage to the shape memory members, respectively.

In example embodiments, the control voltage may be applied to some of the shape memory members according to a shape of the creases of the bendable portion.

In example embodiments, a voltage level of the control voltage may differ between the shape memory members according to a shape of the creases of the bendable portion.

In example embodiments, the shape memory members may be transformed to have a curvature corresponding to the folding angle of the foldable display based on the control voltage, respectively.

In example embodiments, the folding control unit may determine the control voltage corresponding to the folding angle of the foldable display based on a mapping table that stores mapping information between the control voltage and the folding angle of the foldable display.

In example embodiments, the control voltage may increase as the folding angle of the foldable display increases. In addition, each of the shape memory members may be a member that contracts as the control voltage increases.

In example embodiments, the control voltage may decrease as the folding angle of the foldable display increases. In addition, each of the shape memory members may be a member that expands as the control voltage increases.

In example embodiments, the mapping table may be updated according to degradation of the bendable portion.

DETAILED DESCRIPTION OF THE EMBODIMENTS

Hereinafter, embodiments of the present invention will be explained in detail with reference to the accompanying drawings. Although the terms "first", "second", etc. may be used herein to describe various elements, these elements, should not be limited by these terms. These terms may be used to distinguish one element from another element. Thus, a first element discussed below may be termed a second element without departing from the teachings of the present invention. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

Figure 1:
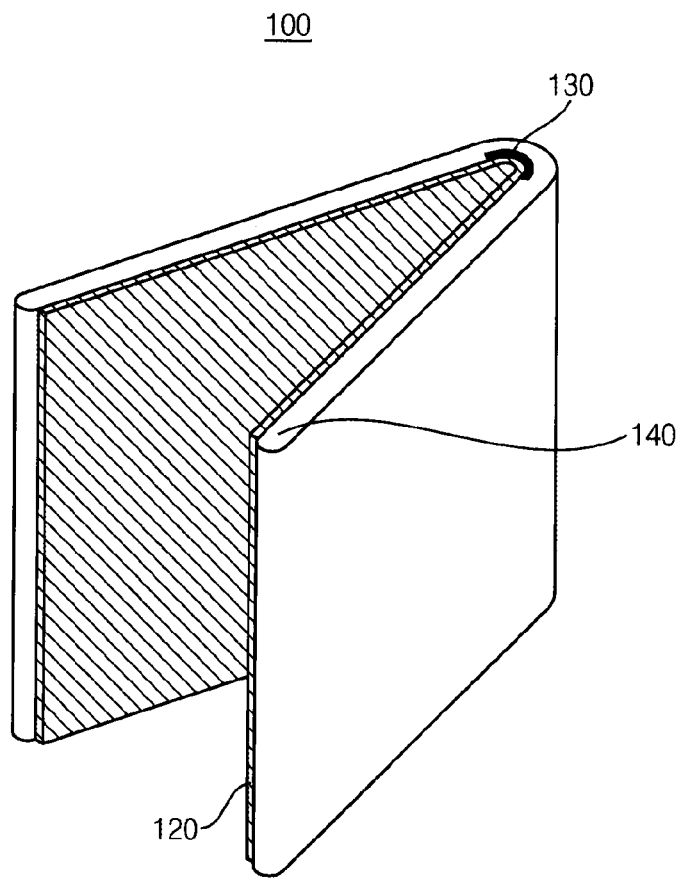
FIG. 1 is a schematic perspective view illustrating an electronic device according to example embodiments.
Figure 2:
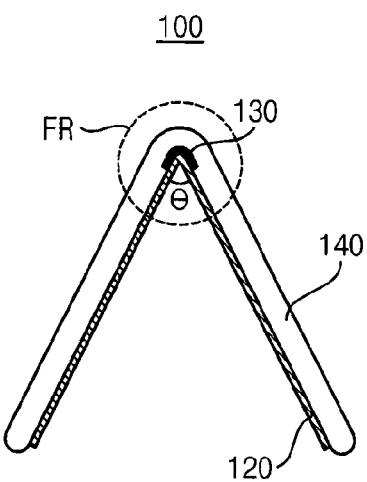
FIG. 2 is a schematic elevation view illustrating an electronic device according to example embodiments.
Figure 3:
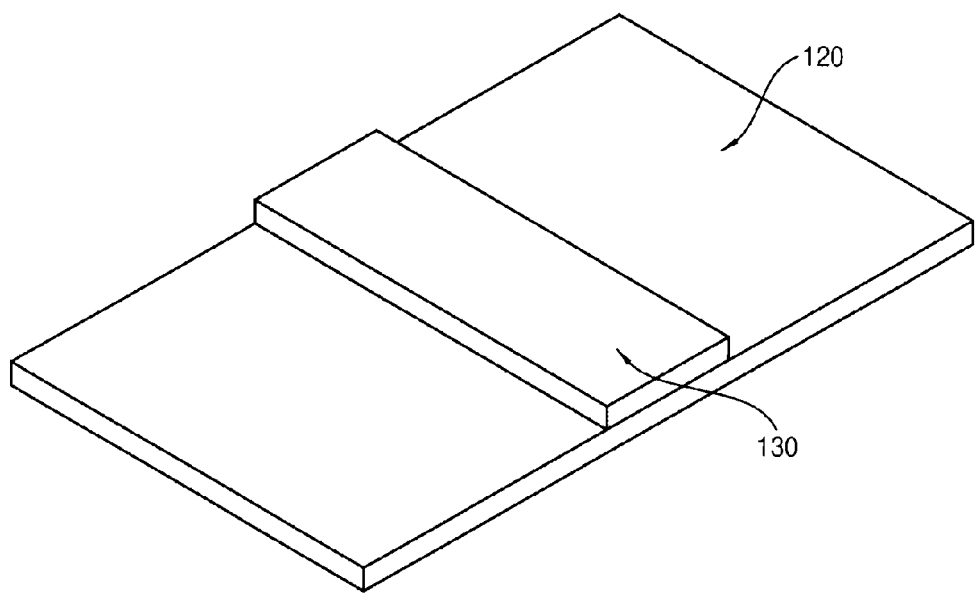
FIG. 3 is a schematic perspective view illustrating a foldable display device that may include a foldable display member (or foldable display) and controllable member (e.g., a shape memory member) according to example embodiments.

FIG. 1 is a schematic perspective view illustrating an electronic device 100 according to example embodiments. FIG. 2 is a schematic elevation view illustrating the electronic device 100 according to example embodiments. FIG. 3 is a diagram illustrating a foldable display device that may include a foldable display member 120 (or foldable display 120) and a controllable member 130 (e.g., a shape memory member 130) according to example embodiments.

Referring to FIGS. 1 through 3, the electronic device 100 may include the foldable display 120, the shape memory member 130, and a body 140. The electronic device 100 may include the foldable display device, which may include the foldable display 120 and the shape memory member 130. In example embodiments, the electronic device 100 may be a mobile device. In example embodiments, the electronic device 100 may be one of a cellular phone, a smart phone, a smart pad, a tablet computer, a notebook computer, a personal digital assistants (PDA), a portable multimedia player (PMP), an MP3 player, a television, a computer monitor, a laptop, a digital camera, a camcorder, a game console, etc. In example embodiments, the electronic device 100 may be one of other devices.

The foldable display 120 may display an image on its front-side. A bendable portion FR may enable and/or facilitate folding operations and unfolding operations of the foldable display 120. The foldable display 120 may be combined with the body 140. The body 140 may be manufactured with one or more flexible materials and may support folding operations of the foldable display 120. As the body 140 is folded or unfolded by a user, the foldable display 120 may be folded or unfolded accordingly. In example embodiments, the foldable display 120 may be a display device configured for displaying one or more images. In example embodiments, the foldable display 120 may be a touch-screen device that includes a display device for displaying images and a touch sensing device for sensing a user's touch-input. In example embodiments, as illustrated in FIGS. 1 through 3, the shape memory member 130 may be attached to a back-side of the foldable display 120. The shape memory member 130 may overlap the bendable portion FR of the foldable display 120. The shape memory member 130 may enable and/or facilitate substantial removal of creases of the bendable portion FR of the foldable display 120 according to control signal (e.g., a control voltage) that is generated in response to a folding angle θ of the foldable display 120. Advantageously, the bendable portion FR may have a substantially smooth and/or flat surface when the foldable display 120 displays images, such that satisfactory image display quality may be provided.

The shape memory member 130 may enable and/or facilitate substantial removal of the creases of the bendable portion FR of the foldable display 120 by expanding and/or contracting according to the control voltage that is generated in response to the folding angle θ of the foldable display 120. The shape memory member 130 may be transformed to have a curvature corresponding to (e.g., matching) the folding angle θ of the foldable display 120 according to the control voltage. In example embodiments, the shape memory member 130 may contract as the control voltage increases. In example embodiments, the shape memory member 130 may expands as the control voltage increases.

The electronic device 100 (e.g., in the body 140) may include a folding control unit. The folding control unit may sense (and/or determine the magnitude of) the folding angle θ of the foldable display 120, may determine the control voltage based on (the magnitude of) the folding angle θ of the foldable display 120, and may apply the control voltage to the shape memory member 130. In example embodiments, the folding control unit may include a folding angle detecting unit that may sense (and/or determine the magnitude of) the folding angle θ of the foldable display 120, a control voltage calculating unit that may determine the control voltage based on (the magnitude of) the folding angle θ of the foldable display 120, and a control voltage applying unit that may apply the control voltage to the shape memory member 130. In example embodiments, the folding control unit may be placed outside the body 140. In example embodiments, the folding control unit may determine the control voltage based on a mapping table (or mapping function) that stores (or defines) information related to mapping between values of the control voltage and magnitudes (or values) of the folding angle θ of the foldable display 120. The mapping table and/or mapping function may be stored in a memory device or storage device in the electronic device 100. For different magnitudes of the folding angle θ of the foldable display 120, respective corresponding control voltages may be applied to control the shape memory member 130 to have suitable shapes for substantially removing the creases of the bendable portion FR of the foldable display 120.

In example embodiments, the shape memory member 130 is configured to contract as the control voltage increases, and according to the mapping table (or mapping function) the control voltage may increase as the folding angle θ of the foldable display 120 increases. For example, when the folding angle θ of the foldable display 120 is relatively small (i.e., when the foldable display 120 is folded), the control voltage applied to the shape memory member 130 may be decreased because the shape memory member 130 needs to expand (from a size when the folding angle θ of the foldable display 120 is relatively large). In example embodiments, the shape memory member 130 is configured to expand as the control voltage increases, and according to the mapping table (or mapping function) the control voltage may decrease as the folding angle θ of the foldable display 120 increases. For example, when the folding angle θ of the foldable display 120 is relatively small (i.e., when the foldable display 120 is folded), the control voltage applied to the shape memory member 130 may be increased because the shape memory member 130 needs to expand (from a size when the folding angle θ of the foldable display 120 is relatively large). In example embodiments, the control voltage may be linearly mapped (or related) to the folding angle θ of the foldable display 120 according to the mapping table (or mapping function). In example embodiments, the control voltage may be non-linearly mapped (or related) to the folding angle θ of the foldable display 120 according to the mapping table (or mapping function). In example embodiments, the mapping table (or mapping function) may be updated according to degradation of the bendable portion FR of the foldable display 120.

In example embodiments, the foldable display 120 is a display device, and the body 140 may include a display controller. In example embodiment, the foldable display 120 is a touch-screen device, and the body 140 may include a display controller and a touch sensing controller. The display controller may control display operations of the foldable display 120, and the touch sensing controller may control touch sensing operations of the foldable display 120. In example embodiments, the body 140 may include one or more of a processor, a communication device, a memory device, a storage device, function sensors, etc.

The processor may perform various computing functions. For example, the processor may control an overall operation of the electronic device 100. In example embodiments, the processor may be or may include one or more of a microprocessor, a central processing unit (CPU), etc. The processor may be coupled to one or more other components via one or more of an address bus, a control bus, a data bus, etc. In example embodiments, the processor may be coupled to an extended bus, such as a peripheral component interconnection (PCI) bus.

The memory device may store data for operations of the electronic device 100. The memory device may include one or more volatile semiconductor memory devices, such as one or more of a dynamic random access memory (DRAM) device, a static random access memory (SRAM) device, a mobile DRAM device, etc. The memory device may include one or more non-volatile semiconductor memory devices, such as one or more of an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc.

The storage device may include one or more of a solid state drive (SSD) device, a hard disk drive (HDD) device, a CD-ROM device, etc.

The function sensors may detect various operations for the electronic device 100. The function sensors may include a folding angle detecting unit that may detect (the magnitude of) the folding angle θ of the foldable display 120.

Although FIGS. 1 and 2 illustrate that the electronic device 100 may a wallet shape, the electronic device 100 is not limited thereto. In example embodiments, may perform one or more other folding operations. In example, as illustrated in FIGS. 1 through 3, the foldable display 120 included in the electronic device 100 may have a symmetrical shape with respect to the bendable portion FR of the foldable display 120. In example embodiments, the foldable display 120 included in the electronic device 100 may have an asymmetric shape with respect to the bendable portion FR of the foldable display 120. In example embodiments, one bendable portion FR exists in the foldable display 120. In example embodiments, a plurality of bendable portions FR may be included in the foldable display 120.

Figure 4:
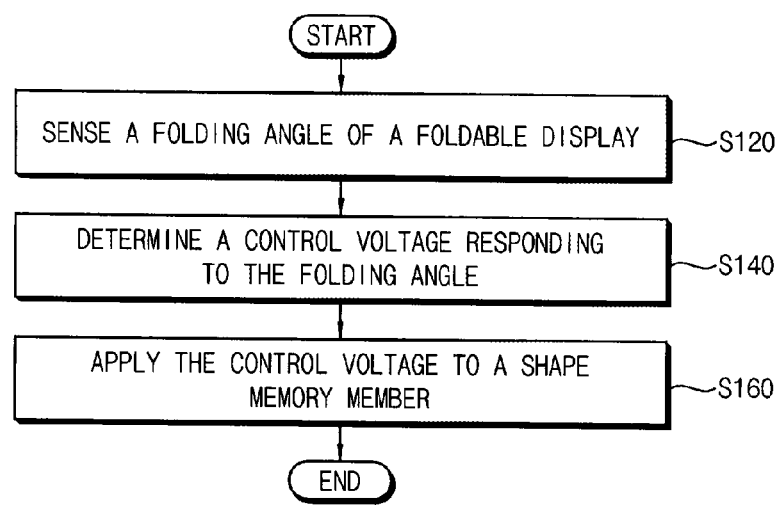
FIG. 4 is a flowchart illustrating a method for controlling a shape memory member in an electronic device and/or in a foldable display device to control a surface structure of the foldable display device according to embodiments.
Figure 5:
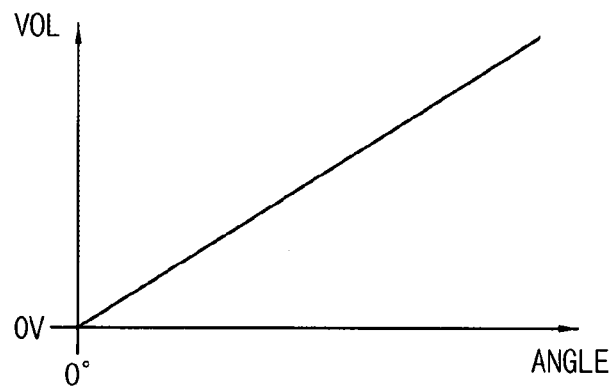
FIG. 5 is a graph illustrating an example relationship between a folding angle of a foldable display and a control voltage applied to a shape memory member according to example embodiments.

FIG. 4 is a flow chart illustrating a method for controlling the shape memory member 130 in the electronic device 100 and/or in a foldable display device to control a surface structure of the foldable display device according to example embodiments. FIG. 5 is a graph illustrating an example relationship between a folding angle of the foldable display 120 and a control voltage applied to the shape memory member 130 according to example embodiments.

Referring to FIGS. 4 and 5, the electronic device 100 may generate a control signal, e.g., a control voltage VOL, in response to (or according to) the folding angle θ of the foldable display 120 and may apply the control voltage VOL to the shape memory member 130. In step S120, the electronic device 100 may sense and determine the magnitude of the folding angle θ of the foldable display 120. In step S140, the electronic device 100 may determine the control voltage VOL corresponding to the folding angle θ of the foldable display 120 using, for example, the relationship illustrated in FIG. 5 and/or a mapping table/function. In step S160, the electronic device 100 may apply the control voltage VOL to the shape memory member 130 to control and/or optimize the size, volume, density, and/or shape of the shape memory member 130.

The electronic device 100 may sense and determine the magnitude of the folding angle θ of the foldable display 120 when a folding or unfolding operation of the foldable display 120 is performed. According to the magnitude of the folding angle θ, the electronic device 100 may apply a suitable control voltage to control and/or optimize the size, volume, density, and/or shape of the shape memory member 130 to maintain a tensile force in the foldable display, for substantially preventing and/or removing creases of the bendable portion FR of the foldable display 120.

In example embodiments, as illustrated in FIG. 5, the control signal (e.g., the control voltage VOL) may be linearly related to the folding angle θ of the foldable display 120 according to the mapping table and/or mapping function. In example embodiments, the control voltage VOL may be non-linearly related to the folding angle θ of the foldable display 120 according to the mapping table and/or mapping function. In example embodiments, as illustrated in FIG. 5, the control voltage VOL increases as the folding angle θ of the foldable display 120 increases. In example embodiments, the shape memory member 130 may contract as the control voltage VOL increases. When the folding angle θ of the foldable display 120 is relatively large (i.e., when the foldable display 120 is unfolded), the control voltage VOL applied to the shape memory member 130 may be increased so that the shape memory member 130 may contract. In example embodiments, the control voltage VOL decreases as the folding angle θ of the foldable display 120 increases. In example embodiments, the shape memory member 130 may expand as the control voltage VOL increases. In example embodiments, the control voltage VOL may control the shape memory member 130 to contract as the folding angle θ of the foldable display 120 increases and may control the shape memory member 130 to expand as the folding angle θ of the foldable display 120 decreases. In example embodiments, the mapping table and/or mapping function may be updated according to degradation of the bendable portion FR of the foldable display 120.

Figure 6A:
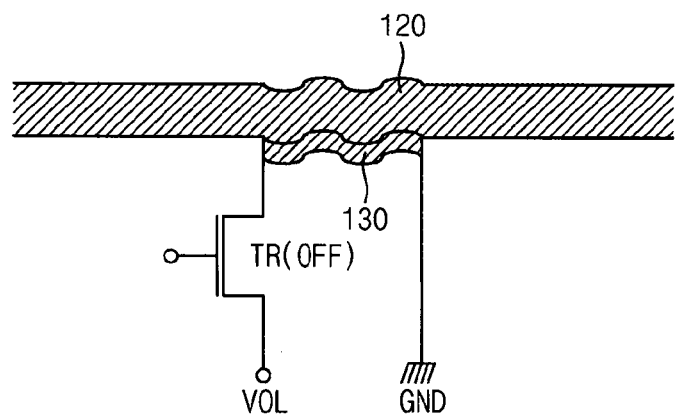
FIGS. 6A and 6B are schematic diagrams (e.g., schematic cross-sectional views) illustrating application of a control voltage to a shape memory member for controlling a surface structure of a foldable display device according to example embodiments.
Figure 6B:
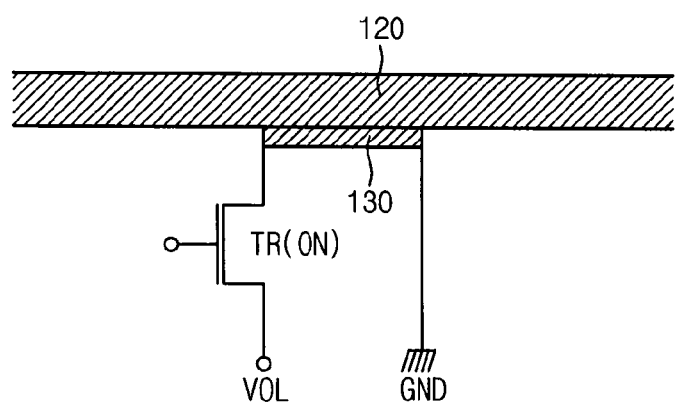

FIGS. 6A and 6B are schematic diagrams (e.g., schematic cross-sectional views) illustrating application of a control voltage to the shape memory member 130 for controlling a surface structure of the foldable display device (which includes the foldable display 120 and the shape memory member 130) according to example embodiments.

Referring to FIGS. 6A and 6B, the shape memory member 130 attached to the back-side of the foldable display 120 and overlaps the bendable portion FR of the foldable display 120. A switching element TR may be coupled to a first terminal of the shape memory member 130, and a ground (which may provide a ground voltage GND) may be coupled to a second terminal of the shape memory member 130. The switching element TR may be coupled between a control voltage applying unit (which may provide the control voltage VOL) and the shape memory member 130. A first terminal of the switching element TR may be coupled to the control voltage applying unit for receiving the control voltage VOL, a second terminal of the switching element TR may be coupled to the first terminal of the shape memory member 130, and a gate terminal of the switching element TR may receive (from the control voltage applying unit) a specific voltage that turns-on or turns-off the switching element TR. In example embodiments, the switching element TR may be n-channel metal oxide semiconductor (NMOS) transistor. In example embodiments, the switching element TR may be p-channel metal oxide semiconductor (PMOS) transistor. In example embodiments, the switching element TR is may be one of various known switching elements.

As illustrated in FIG. 6A, when the foldable display 120 is unfolded (e.g., the folding angle θ of the foldable display 120 is 180°) and before a suitable control voltage VOL is applied to the shape memory member 130 (i.e., when the switching element TR is still in an off state), a shape of the shape memory member 130 may not be optimal, and some creases may exist in the bendable portion FR of the foldable display 120. As illustrated in FIG. 6B, the switching element TR may be turned on, such that the control voltage VOL is applied to the shape memory member 130. As a result, a shape (and/or size) of the shape memory member 130 may be optimized according to the folding angle θ of the foldable display 120, and the shape memory member 130 may maintain a tensile force for substantially removing the creases in the bendable portion FR of the foldable display 120. Advantageously, a high-quality image may be displayed on the foldable display 120. In example embodiments, the control voltage VOL may be gradationally applied to the shape memory member 130, such that the structure of the shape memory member 130 and/or the structure of the foldable display 120 may not be suddenly and/or drastically altered. In example embodiments, the control voltage VOL may be substantially timely applied such that the creases illustrated in FIG. 6A may be substantially prevented.

Figure 7:
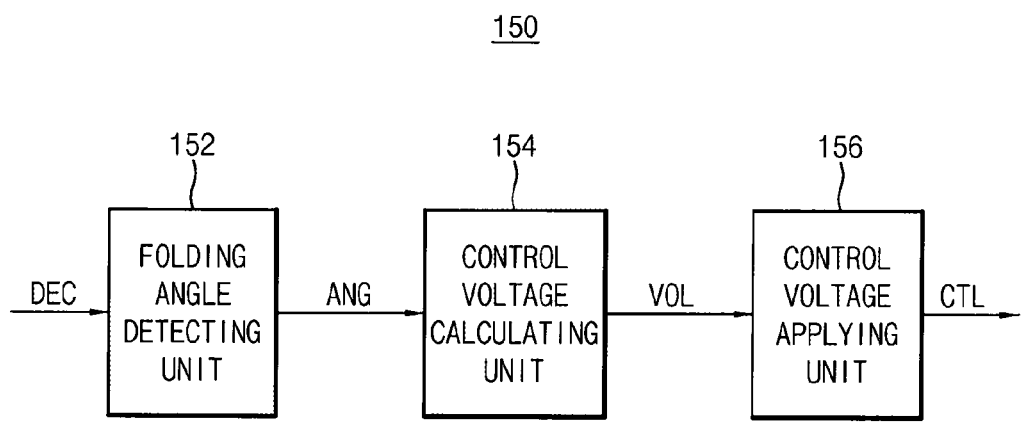
FIG. 7 is a block diagram illustrating a folding control unit according to example embodiments.
Figure 8A:
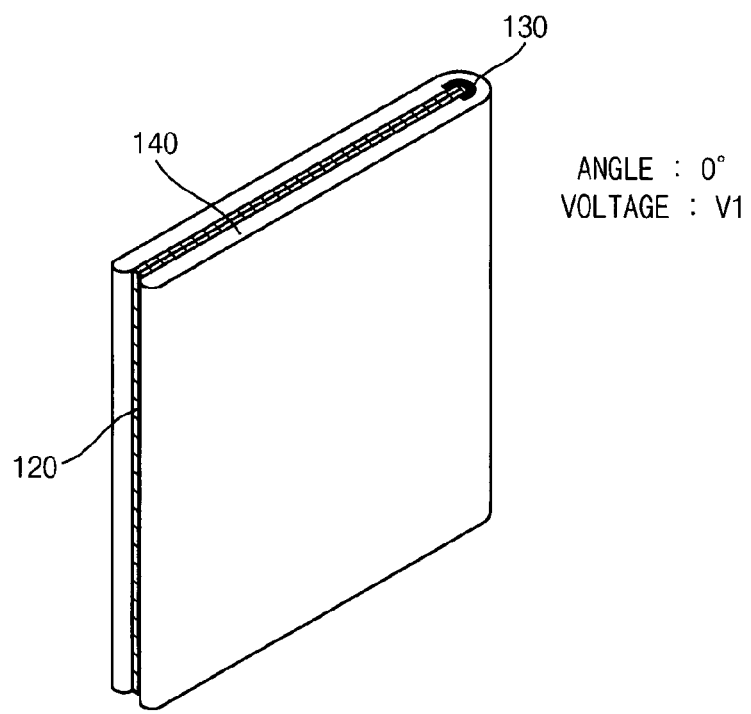
FIGS. 8A, 8B, and 8C are schematic perspective views illustrating folding and/or unfolding operations of a foldable display device and/or an electronic device according to example embodiments.
Figure 8B:
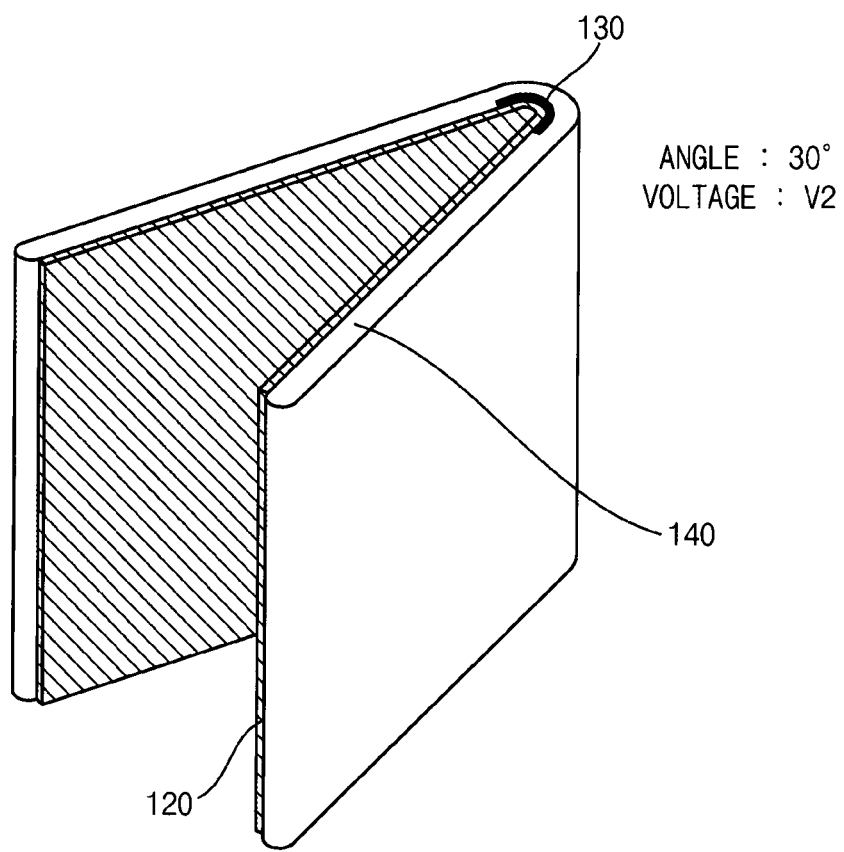
Figure 8C:
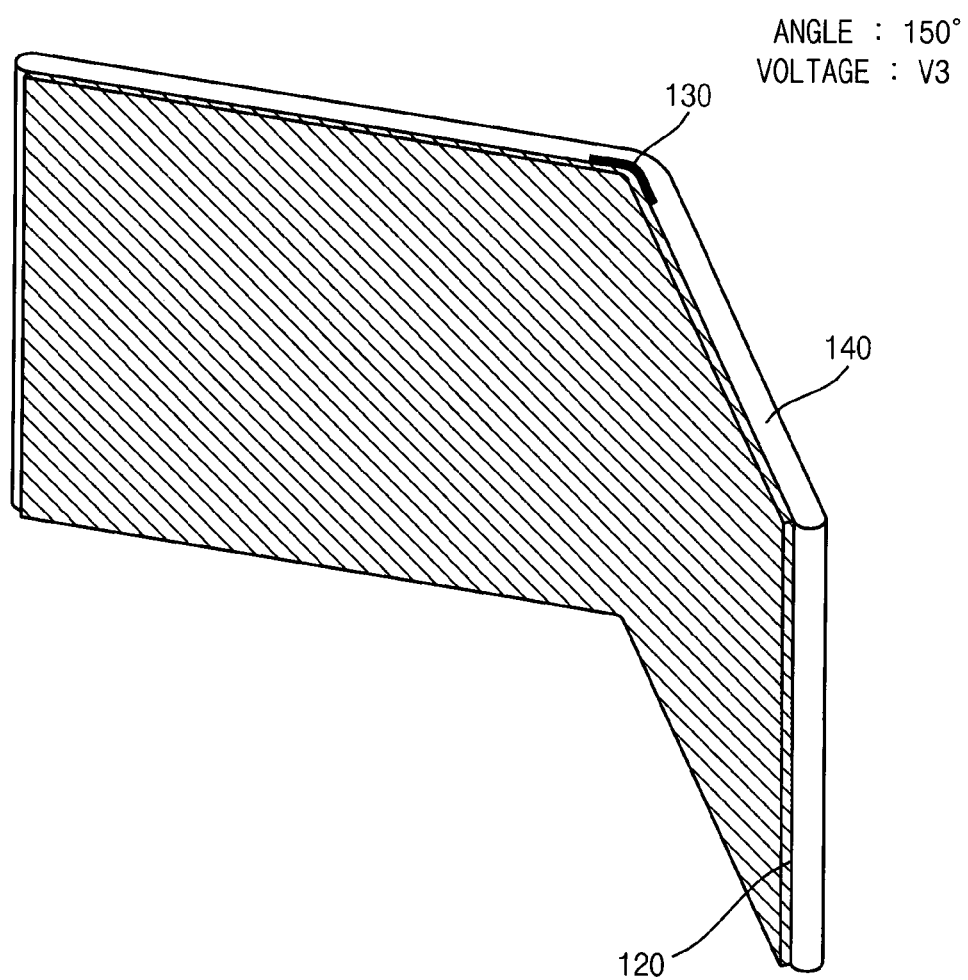

FIG. 7 is a block diagram illustrating a folding control unit according to example embodiments. FIGS. 8A, 8B, and 8C are schematic perspective views illustrating folding and/or unfolding operations of a foldable display device and/or the electronic device 100 according to example embodiments.

Referring to FIG. 7, the folding control unit 150 may include a folding angle detecting unit 152, a control voltage calculating unit 154, and a control voltage applying unit 156. In example embodiments, the folding control unit 150 may include hardware and/or software for performing related functions and may be placed inside the body 140 of the electronic device 100 (illustrated in FIG. 1).

The folding angle detecting unit 152 may receive one or more detection signals DEC related to a folding operation of the foldable display 120 from (e.g., one or more sensing elements of) the foldable display 120, may determine the magnitude ANG of the folding angle of the foldable display 120 based on the detection signal(s) DEC, and may output the folding angle magnitude ANG. The control voltage calculating unit 154 may determine a value of a control signal, e.g., a control voltage VOL, according to the folding angle magnitude ANG and may output the control voltage VOL. The control voltage calculating unit 154 may determine the value of the control voltage VOL using the folding angle magnitude ANG and a mapping table (and/or mapping function). The control voltage applying unit 156 may output a control signal CTL to turn on the switching element TR (illustrated in FIG. 6B) and may apply the control voltage VOL to the shape memory member 130, such that the size and/or shape of the shape memory member 130 may be optimized. As described above, the folding control unit 150 may determine the folding angle magnitude ANG associated with the foldable display 120, may determine the amount of the control voltage VOL, and may apply the control voltage VOL to the shape memory member 130.

FIGS. 8A, 8B, and 8C are schematic perspective views illustrating folding and/or unfolding operations of a foldable display device and/or the electronic device 100 according to example embodiments. Referring to FIGS. 7, 8A, 8B, and 8C, controlled by the folding control unit 150, a shape of the shape memory member 130 may be optimized according to the folding angle magnitude ANG associated with the foldable display 120. FIG. 8A shows that the foldable display 120 is folded (i.e., the folding angle magnitude ANG associated with the foldable display 120 is 0°). Thus, a first control voltage VOL, or V1, may be provided to control the shape memory member 130 to expand, such that the shape memory member 130 may maintain a tensile force for substantially preventing or removing creases of the bendable portion FR of the foldable display 120. FIG. 8B shows that the foldable display 120 is somewhat unfolded (e.g., the folding angle magnitude ANG associated with the foldable display 120 is 30°). Thus, a second control voltage VOL, or V2, may be provided control the shape memory member 130 to contract, such that the shape memory member 130 may maintain a tensile force for substantially preventing or removing creases of the bendable portion FR of the foldable display 120. FIG. 8C shows that the foldable display 120 is significantly unfolded (i.e., the folding angle magnitude ANG associated with the foldable display 120 is 150°). Thus, a third control voltage, or V3, may be provided to control the shape memory member 130 to further contract, such that the shape memory member 130 may maintain a tensile force for substantially preventing or removing the creases of the bendable portion FR of the foldable display 120.

Figure 9:
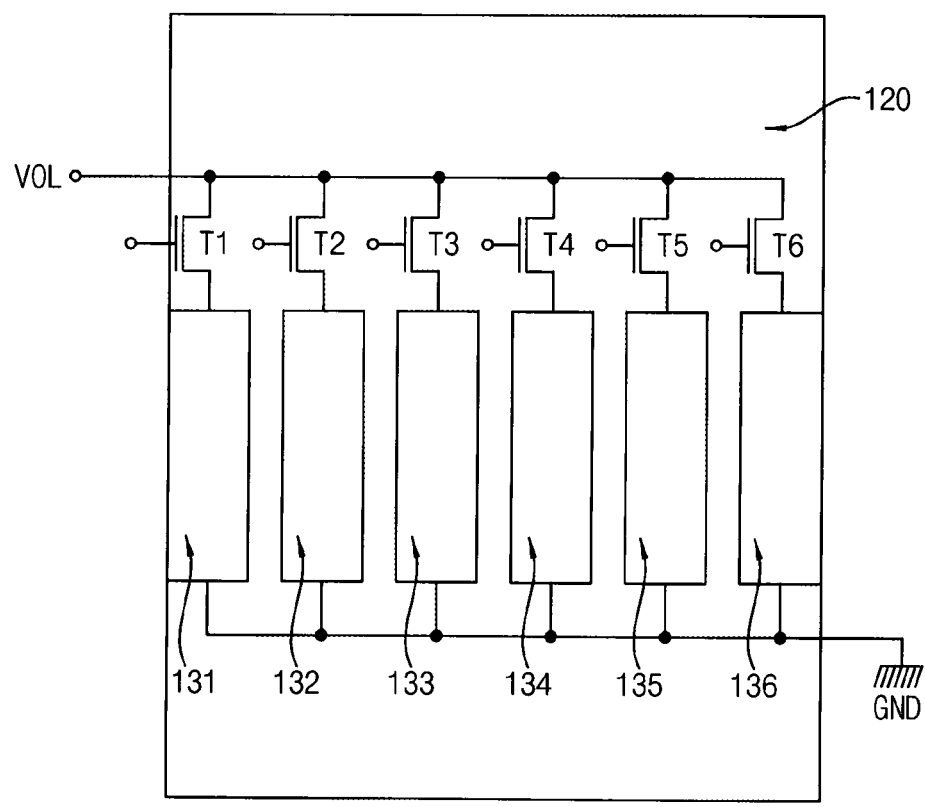
FIG. 9 is a schematic diagram illustrating a foldable display device that includes a plurality of shape memory members attached to a foldable display member (or foldable display) according to example embodiments.

FIG. 9 is a schematic diagram illustrating a foldable display device that includes a plurality of controllable members 131, 132, 133, 134, 135, and 136 (e.g., a plurality of shape memory members 131, 132, 133, 134, 135, and 136) attached to a foldable display 120 according to example embodiments. The foldable display device may be included in an electronic device.

Referring to FIG. 9, a control voltage VOL may be applied to the shape memory members 131 through 136, which may be attached to the back-side of the foldable display 120. The shape memory members 131 through 136 may overlap a bendable portion of the foldable display 120. As illustrated in FIG. 9, the shape memory members 131 through 136 may be aligned in a first direction, and each of the shape memory members 131 through 136 may overlap a portion of the foldable display 120 and may be narrower than the bendable portion of the foldable display 120 in the first direction. Edges of the shape memory members 131 and 136 may overlap edges of the bendable portion of the foldable display 120.

The shape memory members 131 through 136 may be individually controlled for substantially and/or optimally preventing or removing creases of the bendable portion of the foldable display 120 according to the control voltage VOL, which may be generated according to the folding angle θ of the foldable display 120, and application of which may be controlled by switching elements T1, T2, T3, T4, T5, and T6. Since the shape memory members 131 through 136 are respectively disposed on different regions of the bendable portion of the foldable display 120, creases may be prevented or removed at respective subdivided regions of the bendable portion FR of the foldable display 120. In example embodiments, the control voltage VOL may be applied to some, but not all, of the shape memory members 131 through 136 according to a shape of the creases of the bendable portion of the foldable display 120. In example embodiments, different voltages may be applied to different ones of the shape memory members 131 through 136 according to a shape of the creases of the bendable portion of the foldable display 120. In example embodiments, at least some of the switching elements T1 through T6 may be respectively coupled to different control voltage supplying units and/or may be configured to respectively receive different control voltages VOL.

In example, a terminal of each of the shape memory members 131 through 136 may be coupled to a corresponding one of switching elements T1 through T6, and another terminal of each of the shape memory members 131 through 136 may be coupled to ground to receive a ground voltage GND. In example embodiments, each of the switching elements T1 through T6 may be coupled between a control voltage applying unit (which applies the control voltage VOL and/or a specific control voltage) and a corresponding one of the shape memory members 131 through 136. A first terminal of each of the switching elements T1 through T6 may be coupled to the control voltage applying unit (to receive the control voltage VOL or a specific control voltage), a second terminal of each of the switching elements T1 through T6 may be coupled to a corresponding terminal of a corresponding one of the shape memory members 131 through 136, and a gate terminal of each of the switching elements T1 through T6 may receive a specific voltage that turns on or turns off respective the specific switching element. In example embodiments, the switching elements T1 through T6 may be NMOS transistors. In example embodiments, the switching elements T1 through T6 may be PMOS transistors. In example embodiments, the switching elements T1 through T6 may be some of various known switching elements.

In example embodiments, a shape of respective shape memory members 131 through 136 may be separately optimized (e.g., the shape memory members 131 through 136 may separately maintain a tensile force for substantially preventing or removing creases of the bendable portion of the foldable display 120) according to the folding angle θ of the foldable display 120. That is, creases may be substantially prevented or removed at particular subdivided regions of the bendable portion of the foldable display 120. Advantageously, a high-quality image may be displayed on the foldable display 120.

In example embodiments, the control voltage VOL may be gradationally applied to the shape memory members 131 through 136, such that sudden and/or drastic structural changes may be avoided. The control voltage VOL may be determined based on predetermined mapping information in order to optimize a shape of each of shape memory members 131 through 136 according to the folding angle θ of the foldable display 120. In example embodiments, as illustrated in FIG. 9, the shape memory members 131 through 136 are arranged in series on the back-side (i.e., corresponding to the bendable portion) of the foldable display 120. In example embodiments, the shape memory members 131 through 136 may be arranged according to one or more of other arrangements.

Figure 10:
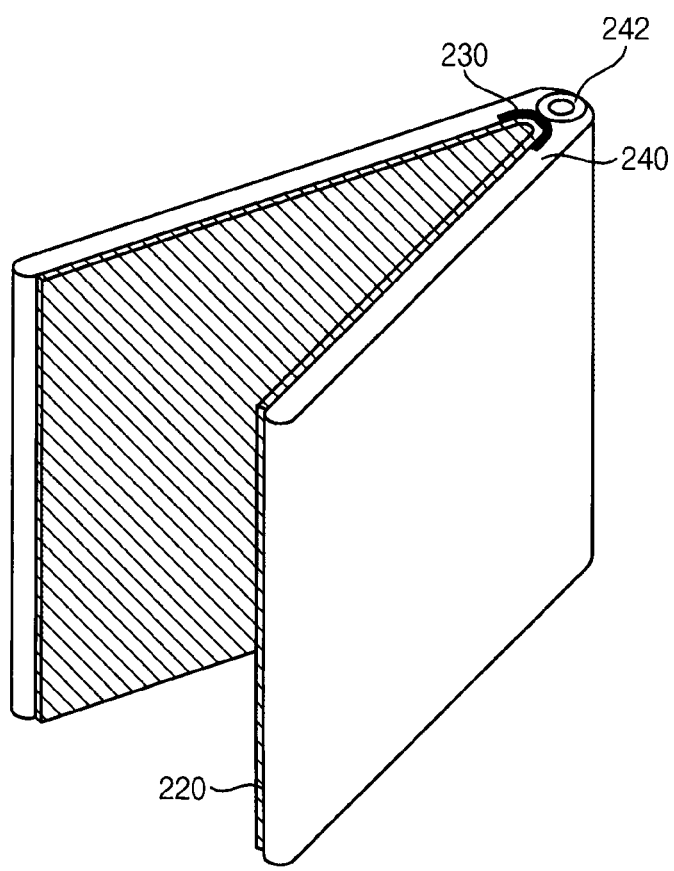
FIG. 10 is a schematic perspective view illustrating an electronic device according to example embodiments.

FIG. 10 is a schematic perspective view illustrating an electronic device 200 according to example embodiments.

Referring to FIG. 10, the electronic device 200 may include a foldable display member 220 (or foldable display 220), a controllable member 230 (e.g., a shape memory member 230), and a body 240. In example embodiments, some elements, structures, features, and/or advantages of the electronic device 200 may be analogous to and/or identical to some elements, structures, features, and/or advantages of the electronic device 100 discussed with reference to FIGS. 1 through 8C. In example embodiments, some elements, structures, features, and/or advantages of one or more of the foldable display member 220, the controllable member 230, and the body 240 may be analogous to and/or identical to some elements, structures, features, and/or advantages of one or more of the foldable display member 120, the controllable member 130, the controllable member 131, the controllable member 132, the controllable member 133, the controllable member 134, the controllable member 135, the controllable member 136, and the body 140 discussed with reference to one or more of FIGS. 1 through 9.

The foldable display 220 may be combined with the body 240. The body 240 may be manufactured with one or more substantially non-flexible materials and may include two portions that are connected by a hinge 242. The hinge 242 may enable folding and unfolding operations of the foldable display 220 and the electronic device 200.

Analogous to one or more of the controllable member 130, the controllable member 131, the controllable member 132, the controllable member 133, the controllable member 134, the controllable member 135, and the controllable member 136 and related mechanisms, the controllable member 230 (and/or one or more additional controllable members of the electronic device 200) and related mechanisms may enable substantial prevention and/or removal of creases in the foldable display 200. Advantageously, distortion of images displayed by the foldable display 220 may be substantially prevented or minimized, and the electronic device 200 may provide satisfactory image display quality.

As the body 240 is folded or unfolded by users, the foldable display 220 may be folded or unfolded. In an example embodiment, as illustrated in FIG. 10, the shape memory member 230 may be attached to a back-side of the foldable display 220, where the shape memory member 230 is disposed to be overlapped with the bendable portion FR of the foldable display 220. Here, the shape memory member 230 may remove creases of the bendable portion FR of the foldable display 220 based on a control voltage that is generated in response to a folding angle θ of the foldable display 220. In another example embodiment, a plurality of shape memory members 230 may be partially attached to the back-side of the foldable display 220, where the shape memory members 230 are disposed to be overlapped with the bendable portion FR of the foldable display 220. Here, the shape memory members 230 may separately remove the creases of the bendable portion FR of the foldable display 220 based on the control voltage that is generated in response to the folding angle θ of the foldable display 220. That is, since the shape memory members 230 are partially disposed on the back-side (i.e., corresponding to the bendable portion FR) of the foldable display 220, the creases may be removed at respective subdivided regions of the bendable portion FR of the foldable display 220.

As described above, the shape memory member 230 may be attached to the back-side of the foldable display 220, where the shape memory member 230 is disposed to be overlapped with the bendable portion FR of the foldable display 220. Thus, the shape memory member 230 may remove the creases of the bendable portion FR of the foldable display 220 by expanding or contracting based on the control voltage that is generated in response to the folding angle θ of the foldable display 220. In other words, the shape memory member 230 may be transformed to have the curvature corresponding (i.e., matching) to the folding angle θ of the foldable display 220 based on the control voltage that is generated in response to the folding angle θ of the foldable display 220. In an example embodiment, the shape memory member 230 may be a member that contracts as the control voltage that is generated in response to the folding angle θ of the foldable display 220 increases. In another example embodiment, the shape memory member 230 may be a member that expands as the control voltage that is generated in response to the folding angle θ of the foldable display 220 increases. The body 240 may include a folding control unit that senses the folding angle θ of the foldable display 220, that determines the control voltage responding to the folding angle θ of the foldable display 220, and that applies the control voltage to the shape memory member 230. In an example embodiment, the folding control unit may determine the control voltage responding to the folding angle θ of the foldable display 220 based on a mapping table that stores mapping information between the control voltage and the folding angle θ of the foldable display 220. Here, the control voltage may be linearly mapped with the folding angle θ of the foldable display 220 in the mapping table. Alternatively, the control voltage may be non-linearly mapped with the folding angle θ of the foldable display 220 in the mapping table. In some example embodiments, the mapping table may be updated according to degradation degree of the bendable portion FR of the foldable display 220.

As described above, the electronic device 200 including the foldable display 220 may prevent an image from being distorted on the bendable portion FR of the foldable display 220 because the electronic device 200 removes the creases of the bendable portion FR of the foldable display 220 using the shape memory member 230 attached to the back-side of the foldable display 220, where the shape memory member 230 is disposed to be overlapped with the bendable portion FR of the foldable display 220. As a result, the electronic device 200 may output a high-quality image. In addition, when a plurality of shape memory members 230 are partially attached to the back-side (i.e., corresponding to the bendable portion FR) of the foldable display 220 in the electronic device 200, the creases may be removed at respective subdivided regions of the bendable portion FR of the foldable display 220. Although it is illustrated in FIG. 10 that the electronic device 200 is a mobile device having a wallet shape, the electronic device 200 is not limited thereto. In addition, although it is illustrated in FIG. 10 that the foldable display 220 included in the electronic device 200 has a symmetrical shape with respect to the bendable portion FR of the foldable display 220, the foldable display 220 included in the electronic device 200 may have an asymmetric shape with respect to the bendable portion FR of the foldable display 220. Further, although it is illustrated in FIG. 10 that one bendable portion FR exists in the foldable display 220, a plurality of bendable portions FR may exist in the foldable display 220.

Embodiments of the present invention may be related to an electronic device (e.g., a mobile device) that includes a foldable display. In example embodiments, embodiments of the present invention may be related to one or more of a cellular phone, a smart phone, a smart pad, a personal digital assistants (PDA), a portable multimedia player (PMP), an MP3 player, a television, a computer monitor, a laptop, a digital camera, a camcorder, a game console, etc.

The foregoing is illustrative of example embodiments of the present invention and is not to be construed as limiting. Although a few example embodiments have been described, those skilled in the art will readily appreciate that many modifications are possible in the example embodiments without materially departing from the novel teachings and advantages of the present invention. All such modifications are intended to be included within the scope of the present invention as defined in the claims.

What is claimed is:

1. A display device comprising:
   a foldable display member including a first portion, a second portion, and a bendable portion, wherein the first portion is connected through the bendable portion to the second portion;
   a first controllable member overlapping the bendable portion; and
   a control unit connected to the first controllable member and configured to provide a first signal to control a size of the first controllable member according to a magnitude of an angle between the first portion and the second portion.

2. The display device of claim 1, wherein the first signal is configured to control the first controllable member to enlarge if the angle is reduced, and wherein the first signal is configured to control the first controllable member to contract if the angle is enlarged.

3. The display device of claim 1, wherein the first signal is a voltage.

4. The display device of claim 1, wherein the control unit is further configured to determine a value of the first signal according to a surface condition of the bendable portion.

5. The display device of claim 1, further comprising: a memory device storing a mapping relation between values of the first signal and magnitudes of the angle, wherein the control unit is configured to determine a value of the first signal using the mapping relation.

6. The display device of claim 5, wherein the memory device is configured to update the mapping relation according to degradation of the bendable portion.

7. The display device of claim 1, wherein the first controllable member includes a first terminal and a second terminal, wherein the first terminal is electrically connected to the control unit, and wherein the second terminal is electrically connected to a ground.

8. The display device of claim 7, wherein the first terminal is electrically connected through a switching element to the control unit.

9. The display device of claim 1, further comprising: a second controllable member overlapping the bendable portion, wherein the first controllable member overlaps a first region of the bendable portion, wherein the second controllable member overlaps a second region of the bendable portion, and wherein the control unit is connected to the second controllable member and is configured to control a size of the second controllable member.

10. The display device of claim 9, further comprising:
a first switching element electrically connected between the control unit and the first controllable member; and
a second switching element electrically connected between the control unit and the second controllable member.

11. The display device of claim 9, wherein the control unit is configured to provide a second signal to control the size of the second controllable member, and wherein a value of the second signal is unequal to a value of the first signal when the control unit provides first signal and the second signal simultaneously.

12. The display device of claim 9, wherein the control unit is configured to provide a second signal to control the size of the second controllable member, and wherein a value of the second signal is determined according to a surface condition of the second region of the bendable portion.

13. An electronic device comprising:
a first body member;
a foldable display member overlapping the first body member and including a first portion, a second portion, and a bendable portion, wherein the first portion is connected through the bendable portion to the second portion;
a controllable member overlapping the bendable portion; and
a control unit connected to the controllable member and configured to provide a signal to control a size of the controllable member according to a magnitude of an angle between the first portion and the second portion.

14. The electronic device of claim 13, wherein the first body member includes a flexible portion, and wherein the controllable member is disposed between the bendable portion and the flexible portion.

15. The electronic device of claim 13, further comprising:
a hinge; and
a second body member connected through the hinge to the first body member,
wherein the controllable member is disposed between the bendable portion and the hinge.

16. A method for controlling a surface structure of a foldable display device, the foldable display device comprising a foldable display member, the method comprising:
determining a magnitude of an angle between two portions of the foldable display member; and
according to the magnitude of the angle, providing a first signal to a first controllable member to control a size of the first controllable member, the first controllable member overlapping a bendable portion of the foldable display member, the two portions of the foldable display member being connected to each other through the bendable portion of the foldable display member.

17. The method of claim 16, wherein the first signal controls the first controllable member to enlarge if the angle is reduced, and wherein the first signal controls the first controllable member to contract if the angle is enlarged.

18. The method of claim 16, further comprising:
determining a value of the signal using a stored relation that specifies mapping between magnitudes of the angle and values of the signal; and
updating the stored relation according to degradation of the bendable portion.

19. The method of claim 16, further comprising:
providing a second signal to a second controllable member to control a size of the second controllable member, wherein the first controllable member overlaps a first region of the bendable portion of the foldable display member, and wherein the second controllable member overlaps a second region of the bendable portion of the foldable display member.

20. The method of claim 19, further comprising:
determining a value of the first signal according to a surface condition of the first region of the bendable portion of the foldable display member; and
determining a value of the second signal according to a surface condition of the second region of the bendable portion of the foldable display member.

* * * * *